(12) United States Patent
Boudreau et al.

(10) Patent No.: US 8,214,085 B2
(45) Date of Patent: Jul. 3, 2012

(54) VENTILATOR CONTROL OPTIMIZER

(75) Inventors: Patrick Boudreau, Dieppe (CA); Daniel Reginald Leblanc, Cap-Pele (CA)

(73) Assignee: Air Tech Equipment Ltd., Boudreau-Ouest, New Brunswick (CA)

( * ) Notice: Subject to any disclaimer, the term of this patent is extended or adjusted under 35 U.S.C. 154(b) by 549 days.

(21) Appl. No.: 12/394,499

(22) Filed: Feb. 27, 2009

(65) Prior Publication Data
US 2009/0222138 A1 Sep. 3, 2009

(30) Foreign Application Priority Data
Feb. 28, 2008 (CA) .................................... 2623670

(51) Int. Cl.
*G05B 15/00* (2006.01)
*F24F 3/14* (2006.01)
*F24F 7/007* (2006.01)
(52) U.S. Cl. ...................... 700/276; 236/44 C; 236/49.3
(58) Field of Classification Search ........................ None
See application file for complete search history.

(56) References Cited

U.S. PATENT DOCUMENTS

| 4,962,648 | A * | 10/1990 | Takizawa et al. | 62/199 |
| 5,082,173 | A * | 1/1992 | Poehlman et al. | 236/11 |
| 7,698,903 | B1 * | 4/2010 | Van Hoesen | 62/176.6 |
| 2006/0099904 | A1 * | 5/2006 | Belt et al. | 454/236 |
| 2006/0283963 | A1 * | 12/2006 | Fuller | 236/44 A |

OTHER PUBLICATIONS

General Electric, Optica General Eastern Dew Point Analyzer Operators Manual, General Electric A40238752D, Nov. 2006.*

* cited by examiner

*Primary Examiner* — Kakali Chaki
*Assistant Examiner* — Walter Hanchak
(74) *Attorney, Agent, or Firm* — Dinsmore & Shohl LLP

(57) ABSTRACT

A ventilator control optimizer allowing the control of a ventilator without the need for manual input. The ventilator control optimizer analyzes trends in indoor environmental conditions (dew point, relative humidity, etc.) and makes decisions based on these trends. The ventilator control optimizer is able to change ventilator fan speeds depending on the detected trends. This will prevent the ventilator from operating under conditions which might aggravate the humidity problem indoors. The ventilator control optimizer also allows auxiliary systems (dehumidifier, etc.) to be controlled automatically to deal with high humidity conditions.

20 Claims, 6 Drawing Sheets

VENTILATOR CONTROL OPTIMIZER

TECHNICAL FIELD

The present invention relates to ventilator control, more specifically, the present invention relates to ventilator control optimization.

BACKGROUND OF THE INVENTION

A ventilator generally includes a fan and a set of controls. The controls generally comprise a switch to select various operating speeds, for example but not limited to low, medium, high, etc. and a dehumidistat. The dehumidistat sets the level of relative humidity that will trigger the ventilator to operate at the speed set by the switch.

The ventilator uses the fan to extract humid air, for example, from a basement location and send the extracted humid air to the outside environment, and allows air to be vented from the main floor and into the basement. The air coming from the main floor is generally supplied by fresh air coming in from outside the house.

In ideal situations, the humidity level of the incoming air is lower than the humidity of the original air in the basement. Over time, this will ensure a gradual reduction of the relative humidity level in the basement. However, a problem arises when the incoming air has high levels of humidity. It is undesirable to transfer this humid air from the main floor to the basement as it will increase the relative humidity in the basement.

As described above, the user has access to a switch which controls the ventilator by manually setting the fan speed and a dehumidistat to select the humidity level which will trigger the ventilator to operate. Both these control methods allow the user to prevent the machine from operating in undesirable conditions, such as high humidity. These changes need to be made manually, therefore if the user is not present to make the changes, the ventilator will keep running at its set values.

SUMMARY OF THE INVENTION

A ventilator control optimizer makes a ventilator or ventilation system more adaptable to variations in the dew point and humidity by preventing very humid air from entering the basement or crawlspace and increasing the humidity level. The ventilator control optimizer monitors the environmental conditions using a sensor input and automatically adjusts the operation of the ventilator or ventilation system. The ventilator control optimizer detects and analyzes dew point and humidity trends to more effectively control the level of humidity. The ventilator control optimizer further controls the ventilator or ventilation system to modify its operation in conditions which could increase the indoor humidity level.

Accordingly, as an aspect of the invention there is provided a method for controlling a ventilator or ventilation system for the exchange of air from a first environment to a second environment of a building enclosure. The method comprises the following steps:
  obtaining temperature, humidity and/or dew point temperature measurements of the air within the first environment over time;
  determining trends in the temperature, humidity and/or dew point temperature of the air within the first environment based on the measurements made over time; and
  adjusting a rate of air exchange from the first environment to the second environment based on the determined trends.

In the above method, the rate of air exchange from the first environment to the second environment is lowered if the humidity and/or dew point temperature of the air within the first environment is increasing, and the rate of air exchange from the first environment to the second environment is increased if the humidity and/or dew point temperature of the air within the first environment is decreasing.

In an embodiment, temperature and humidity measurements are taken via one or more sensor(s), e.g. a humidity and temperature sensor, and the dew point is calculated from the temperature and humidity measurements. In this case all three parameters are monitored, i.e. recorded and checked for trends, to achieve a broad analysis of the environmental conditions and efficient humidity control in the first environment. In other embodiments, humidity or temperature alone may be monitored, and the rate of air exchange adjusted based on trends in the humidity or temperature within the first environment.

In an embodiment, the first environment is a basement or crawlspace of a building, such as a house, and the second environment is an environment exterior to, or outside of the building. In this scenario, air may be exchanged, or exhausted from the basement or crawlspace to the outside. By exhausting air from the basement or crawlspace in this manner, outside air enters the house by natural means (e.g. via doors, vents, etc.) and gets "conditioned", i.e. heated or air conditioned, on the main floor or upper levels of the house. The conditioned air is drawn from the main floor and/or upper levels over time into the basement to address the pressure difference caused by the exhausted air. The conditioned air will be either warmer than the basement air, which will reduce the relative humidity of the basement, or air conditioned where some of the moisture from the air has been removed.

In a further embodiment, the temperature, humidity and/or dew point temperature measurements are collected and stored in a memory. For example, the temperature, humidity and/or dew point temperature measurements may be stored in a microcontroller or other device having memory means.

In another embodiment, the ventilator or ventilation system may include an air circulation system. Such an air circulation system typically includes a fan or other air circulation device suitable for moving the air from the first environment to the second environment, e.g. via air ducts. In this case, the fan speed is lowered if the humidity and/or dew point temperature of the air within the first environment is increasing, and the fan speed is increased if the humidity and/or dew point temperature of the air within the first environment is decreasing.

In yet another embodiment, the ventilator or ventilation system may include or cooperate with a dehumidifier, either integrated within the ventilator or ventilation system or as a stand-alone dehumidifier unit. In this case, the method further includes steps of:
  comparing the humidity and/or dew point temperature measurements of the air within the first environment to one or more reference threshold humidity and/or dew point temperature values; and
  activating the dehumidifier when the humidity and/or dew point of the air within the second environment exceeds the one or more reference threshold values.

In the above embodiment, the dehumidifier can be activated based on a comparison of the measured or calculated humidity and/or dew point temperatures with stored reference values. In such a case the stored reference values can be pre-programmed to allow the system to ascertain when to activate the dehumidifier. However, an adaptive system that can re-adjust one or more of the stored reference values after the unit has been operating in a given environment for a period of time is also envisioned.

It is also envisioned that the optional dehumidifier can be placed anywhere in the first environment, e.g. basement or crawlspace, as long as it is controllable by the system to remove moisture from the air as needed. In an embodiment the dehumidifier can be a stand-alone unit. In an alternative embodiment the dehumidifier can be integrated into the ventilator or ventilation system, preferably positioned such that dehumidified air is circulated into the first environment and not exhausted immediately to the second environment.

Also provided herein is a system for optimizing control of a ventilator or ventilation system used for exchanging air from a first environment to a second environment of a building enclosure. The system includes:

- at least one sensor for measuring temperature, humidity and/or dew point temperature conditions of the air within the first environment over time;
- an electronic control system operably linked to the at least one sensor and configured to receive data from the sensor and determine trends in the data over time; and
- a ventilation control system operably linked to the ventilator or ventilation system and controlled by the electronic control system, the ventilation control system being configured to adjust a rate of air exchange from the first environment to the second environment based on the determined trends.

In the above system, the rate of air exchange from the first environment to the second environment is lowered if the humidity and/or dew point temperature of the air within the first environment is increasing, and the rate of air exchange from the first environment to the second environment is increased if the humidity and/or dew point temperature of the air within the first environment is decreasing.

As another aspect, there is also provided a device for controlling a ventilator or ventilation system used for exchanging air from a first environment to a second environment of a building enclosure. The device includes:

- at least one sensor for measuring temperature, humidity and/or dew point temperature conditions of the air within the first environment over time;
- an electronic control system operably linked to the at least one sensor and configured to receive data from the sensor and determine trends in the data over time; and
- a ventilation control system operably linked to the ventilator or ventilation system and controlled by the electronic control system, the ventilation control system being configured to adjust a rate of air exchange from the first environment to the second environment based on the determined trends.

In the above device, the rate of air exchange from the first environment to the second environment is lowered if the humidity and/or dew point temperature of the air within the first environment is increasing, and the rate of air exchange from the first environment to the second environment is increased if the humidity and/or dew point temperature of the air within the first environment is decreasing.

The electronic control system described above includes a microcontroller and circuitry to control power distribution (either AC or DC) to the ventilator or ventilation system, as well as to an optional dehumidifier. The electronic control system may also have its own integrated power supply used to power its low voltage circuitry. The circuitry in the electronic control system can be selected based on the type of control used for controlling the ventilator or ventilation system, or as a further example, fan(s) of the ventilator or ventilation system. For AC control, for example, the circuitry may include Triacs or other such devices. For DC control, for example, the circuitry may include power transistor or other such devices.

The microcontroller of the electronic control system receives the data collected by the sensor or sensors, and stores this information in a memory so that they can be run through the control process of the device, for instance the control process illustrated in FIG. 4.

It is also envisioned that the electronic control system may include a wireless arrangement. As an example, the electronic control system may communicate with a plurality of sensors or dehumidistats positioned throughout a basement or main floor of a house. In this example, these sensors would advantageously be wirelessly linked to the rest of the electronic control system.

The ventilation control system described above integrates the electronic control system with a power supply for operating components of the ventilator or ventilation system, e.g. fan(s) and the optional dehumidifier. In an embodiment, the ventilation control system might include components such as a casing or housing, a power cord for accepting line power, as well as power outlets and/or switches suitable for supplying and/or directing power to, e.g. the fan(s) and optional dehumidifier. In a further embodiment, the electronic control system incorporates relays to switch power on and off to the outlets of the ventilation control system. The ventilation control system, as a unit, may also be integrated into a ventilator unit.

If the sensor is housed within the casing or housing of the ventilation control system, it will be particularly advantageous for the casing or housing to have perforations or other form of venting to allow fresh air from the first environment to pass through the casing/housing, thereby allowing for more effective monitoring of the environmental conditions.

As an optional feature, the casing or housing of the ventilation control system may be equipped with one or more LEDs, an LED panel and/or an LCD panel to display operating details of the ventilation system.

Electronic components of the above-described system and device, including the sensor(s), and electronic components of the electronic and ventilation control systems may, in a further preferred embodiment, be integrated into a printed circuit board.

Within the context of the method, system and apparatus described herein, the rate of air exchange from the first environment to the second environment can under certain circumstances be increased to a maximum level or lowered to a minimum level based on the configuration of the system. For example, in an embodiment whereby a fan or fans are integrated into the system and/or apparatus, the rate of air exchange cannot practically be increased if a fan is already operating at high speed. Conversely, the rate of air exchange cannot practically be lowered if a fan is deactivated, and in other situations where it is desirable to keep the fan or fans operating at low speed it may not be possible to lower the rate of air exchange below a predetermined level. It is therefore to be understood that, under certain circumstances such as those described above, raising or lowering the rate of air exchange from the first environment to the second environment might mean raising or lowering the rate of air exchange to a maximum or minimum level, followed by a period of maintaining the rate of air exchange constant at the maximum or minimum level.

Those skilled in the art will recognize, or be able to ascertain using no more than routine experimentation, numerous equivalents to the specific procedures and embodiments described herein. Such equivalents are considered to be within the scope of this disclosure and are covered by the following claims.

BRIEF DESCRIPTION OF THE DRAWINGS

The following drawings illustrate preferred embodiments of the method, system and device described herein.

DESCRIPTION OF PREFERRED EMBODIMENTS

The ventilator control optimizer is based on the integration of a relative humidity and temperature sensor with an electronic control system. In the examples given in this patent disclosure, a first environment, for example, a basement or crawlspace is used as an example for the location where the ventilator, or ventilation system may be installed. However, it should be apparent to a person skilled in the art that other locations may be used for the ventilator, or ventilation system. In general, a first environment of a building, for example but not limited to, a basement or crawlspace, is intended to describe an environment which is distinct to a second environment, for example but not limited to, an exterior of the building. A dew point of an environment can generally be determined using known relative humidity and temperature. The electronic control system is responsible for analyzing trends in the environmental conditions, for example, in the basement or crawlspace and altering the operation of the ventilator according to the detected trends. The ventilator or ventilation system can either plug directly into the ventilator control optimizer or have an integrated control optimizer built-in. The ventilator control optimizer can be adapted so that it is compatible with different types of fans as well as a wide range of fan control techniques, for example but not limited to triac control, capacitor control, variable voltage, pulse-width modulation (PWM) etc.

Figure 1A:
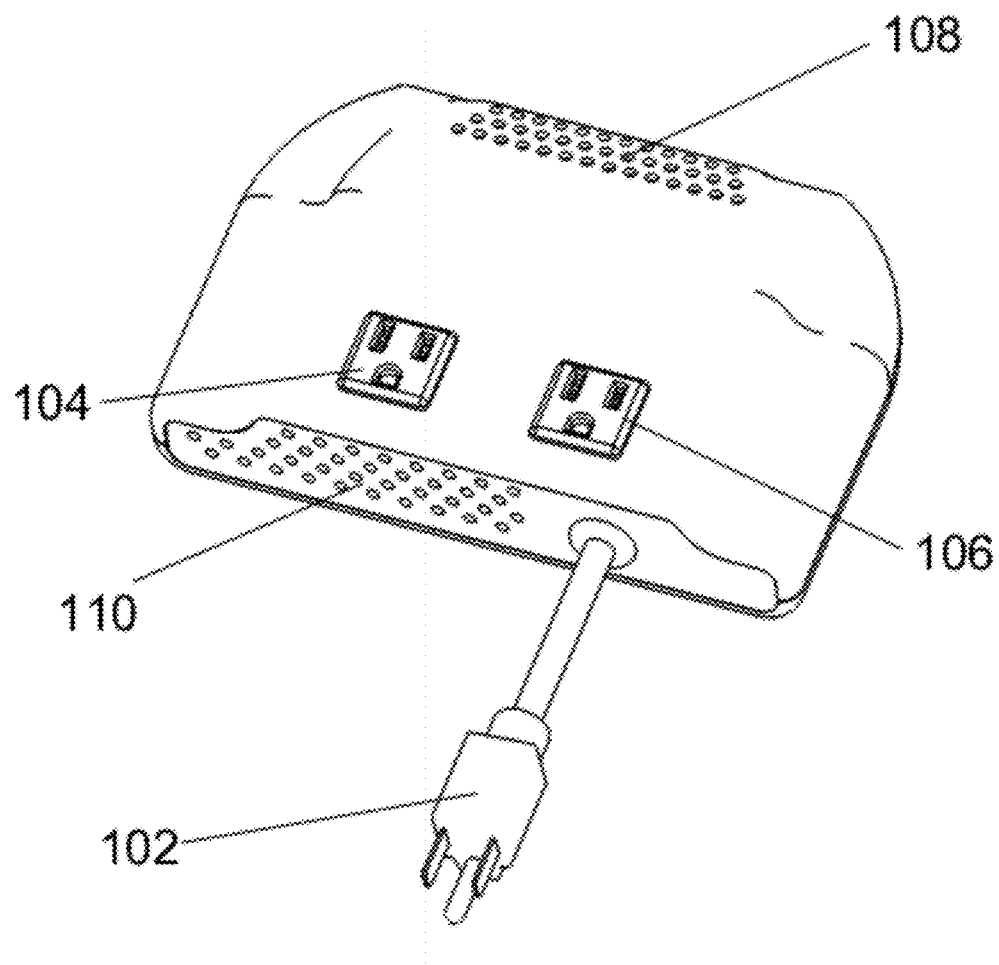
FIG. 1A shows the outside of one embodiment of the ventilator control optimizer described herein.

FIG. 1A shows a ventilator control optimizer in accordance with one embodiment of the invention. The ventilator control optimizer includes a power cord 102 which plugs into an outlet and provides power to the ventilator control optimizer's electronic control system as well as to the plugged-in ventilator and auxiliary system, for example, a dehumidifier. The electronic control system includes a microcontroller and circuitry to control power distribution to the ventilator or ventilation system. The ventilator control optimizer may further provide power outlets 104 and 106 for the ventilator and the auxiliary system, for example, the dehumidifier, respectively. The enclosure is perforated on the bottom 110 and top 108 to allow fresh air to pass through the ventilator control optimizer. The dew point and humidity sensor may be located on the bottom of the ventilator control optimizer, near 110. The ventilator control optimizer in the embodiment shown in FIG. 1 is generally mounted vertically to allow the dew point and humidity sensor near the bottom to have access to fresh air. This further ensures that air warmed by the electronic components rises through the top vents of the enclosure. Proper ventilation through the ventilator control optimizer is needed so that the effect of the heat from the electronic components does not adversely affect the dew point and humidity sensor readings. A person skilled in the art may well envision other modifications to ensure proper dew point and humidity readings, a non-limiting example would be the placement of the dew point and humidity sensor on the surface of the enclosure of the ventilator control optimizer, or alternately the ventilator control optimizer can be wired or wirelessly linked to a sensor placed in a different area than the unit.

Figure 1B:
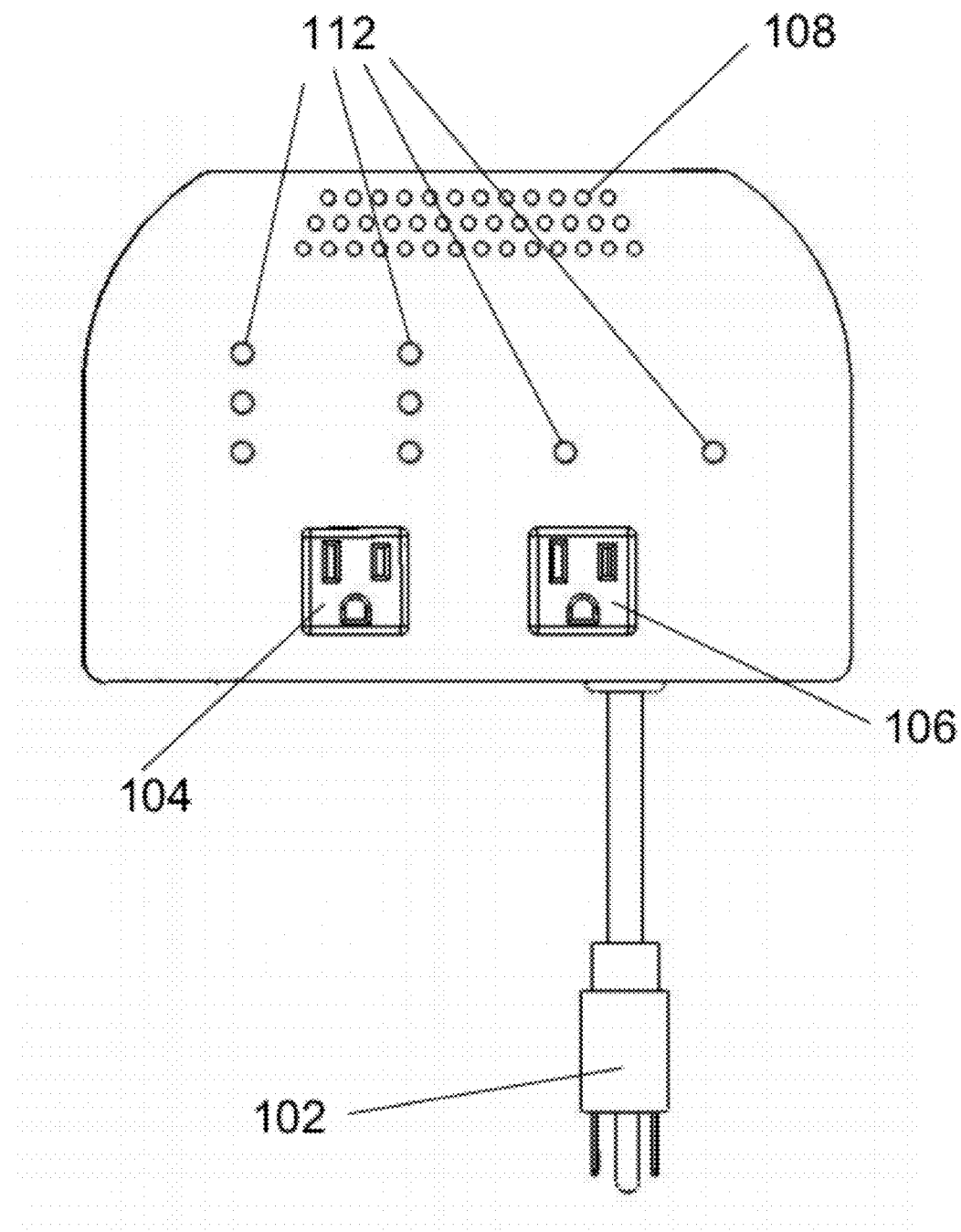
FIG. 1B shows an example of a second embodiment of the ventilator control optimizer illustrated in FIG. 1A, incorporating an LED display.

FIG. 1B shows a possible embodiment of the ventilator control optimizer which includes, among the other features of the ventilator control optimizer illustrated in FIG. 1A, a set of light emitting diodes (LEDs) 112 integrated into the housing and configured to display operational and environmental conditions of the system. For instance, the LEDs might be used to display conditions such as system power, operating speed of the fan, detected dew point trends, and operating status of the dehumidifier. Other conditions and parameters can also be monitored and displayed in the same manner and will be apparent to one skilled in the art. Any number of LEDs can be integrated into the unit housing, for example 1 to 10 LEDs. As shown in FIG. 1B there are 8 LEDs. It is also envisioned to replace the individual LEDs with an LED panel, or alternatively an LCD panel to display the operational and environmental conditions of the system.

Figure 2:
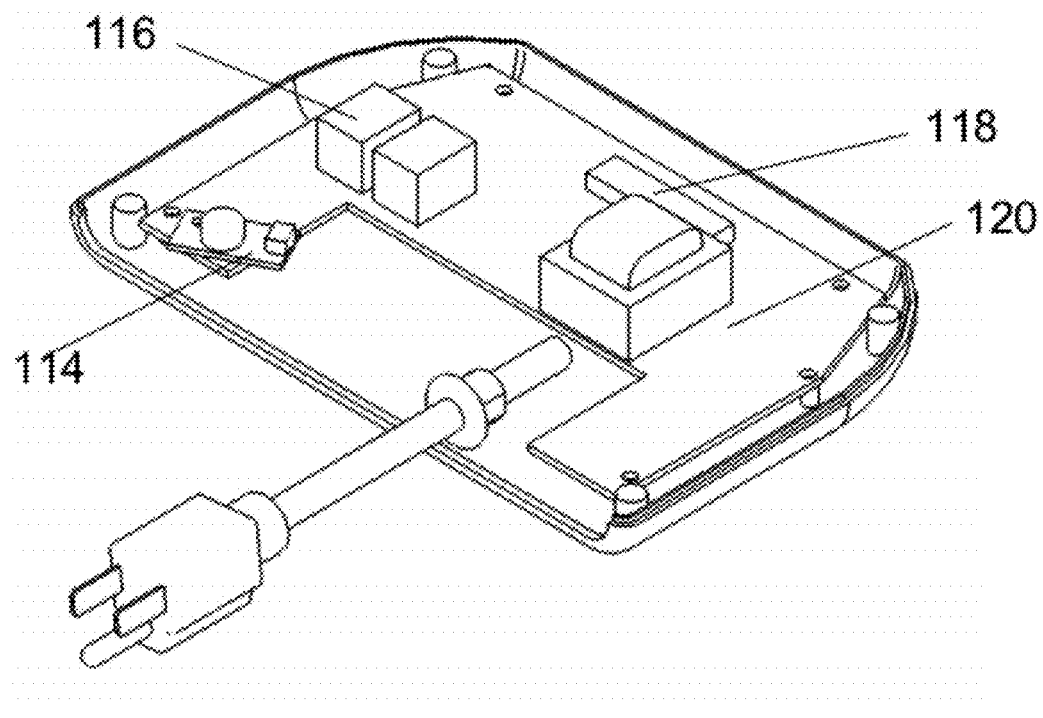
FIG. 2 shows the ventilator control optimizer of FIG. 1 with the top cover removed.

FIG. 2 provides an internal view of the ventilator control optimizer as shown in FIG. 1A. The dew point and humidity sensor is located at 114. The ventilator control optimizer also contains a ventilator control system 116 that can be adapted or modified to work with different types of fans as well as with different fan speed control techniques. The electronic controller system 118 reads the dew point and humidity sensor and other inputs, analyzes trends in the recorded environmental readings and controls the ventilator, or ventilation system accordingly. The electronic components and control systems may generally be integrated into a printed circuit board 120.

Figure 3A:
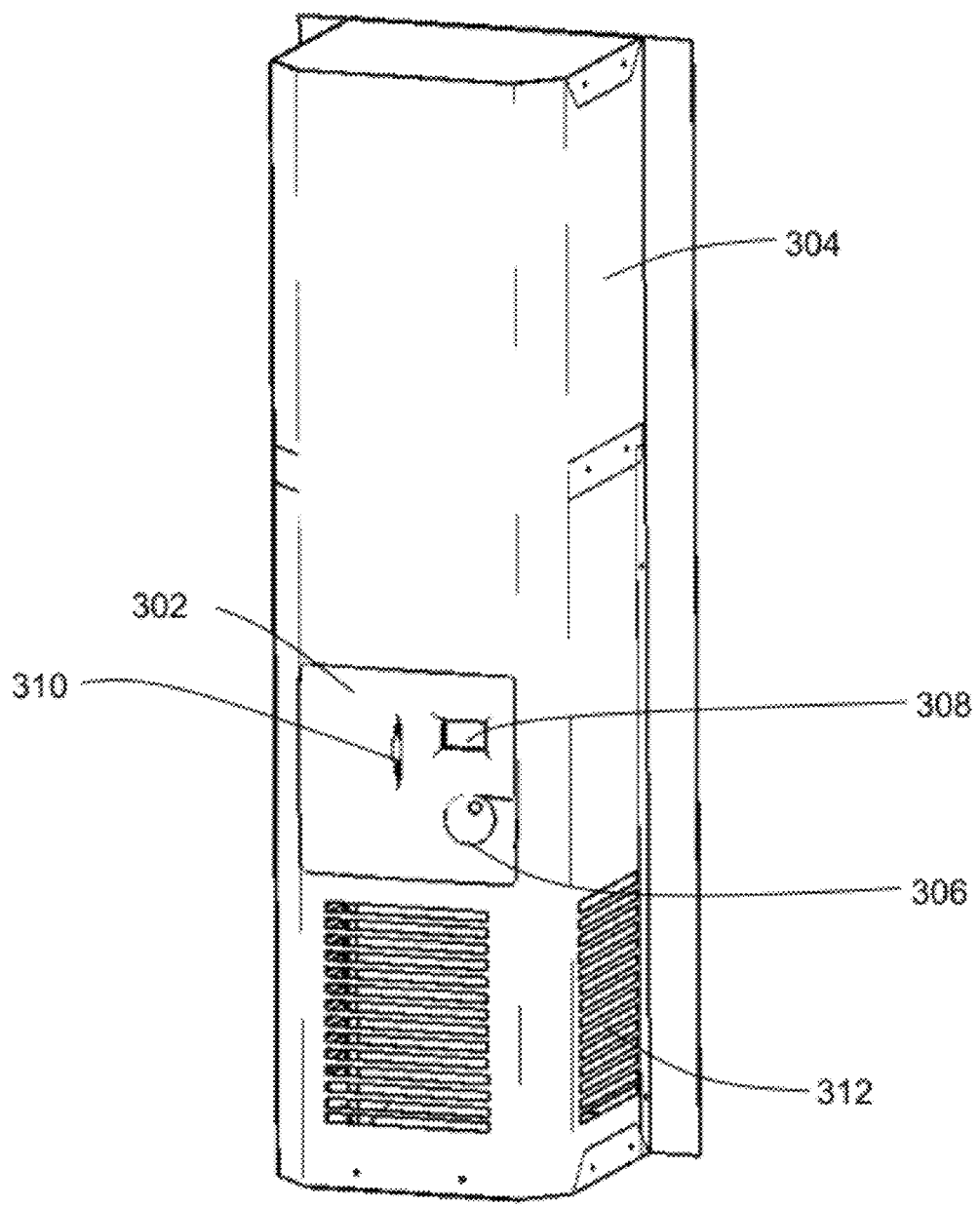
FIG. 3A shows a ventilator with an integrated ventilator control optimizer in accordance with another embodiment of the system and device described herein.

FIG. 3A shows a ventilator control optimizer in accordance with another embodiment of the present invention. The ventilator control optimizer 302 is integrated with a ventilating system 304, for example but not limited to, a ventilator. The ventilator control optimizer 302 has a dehumidistat 306 and a switch 310, generally used for, but not limited to, speed selection. The ventilator control optimizer may optionally include a display 308. The display may also be used to show current environmental conditions, such as relative humidity. The ventilator has air intakes 312 that may be different from those shown in this embodiment. It should be apparent to a person skilled in the art that the ventilator control optimizer of the present invention may be used with other ventilators or ventilation systems.

Figure 3B:
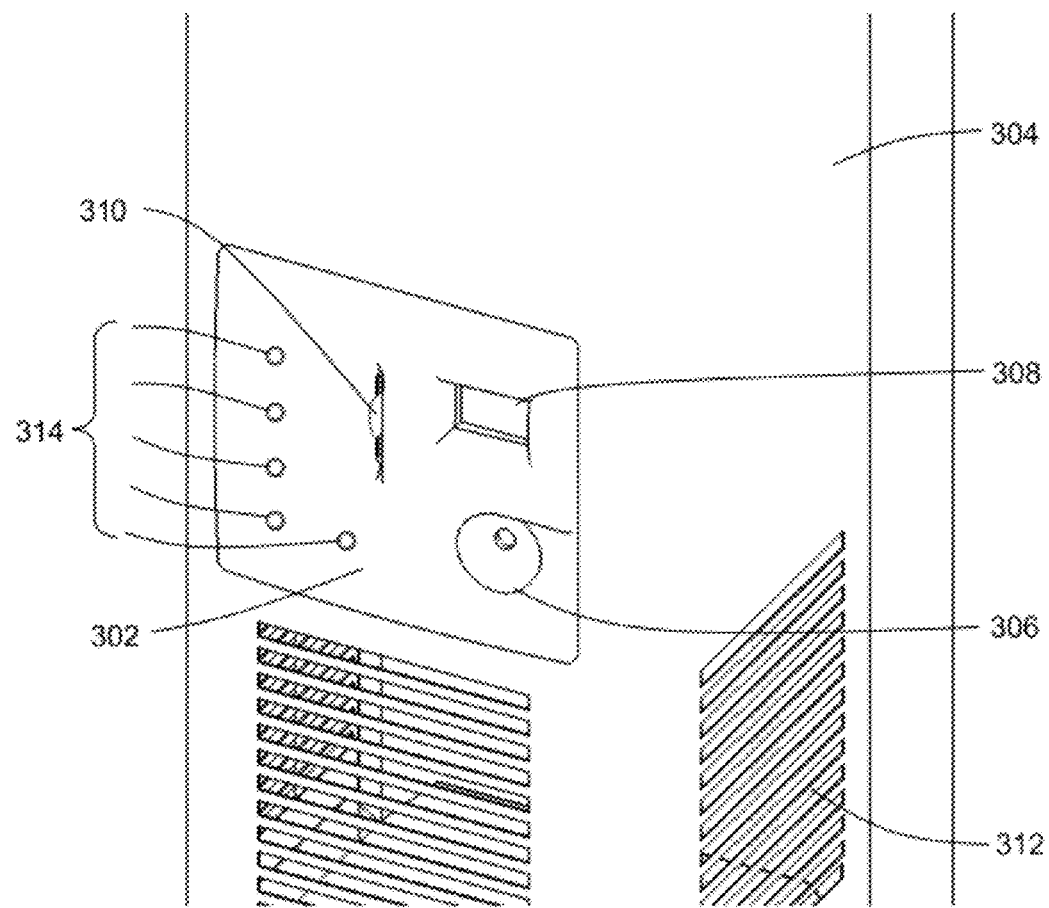
FIG. 3B shows a close up view of the panel of the integrated ventilator control optimizer illustrated in FIG. 3A, further illustrating an example of a second possible embodiment thereof incorporating an LED display.

FIG. 3B shows an example of a further embodiment of the ventilator control optimizer which includes, among the other features of the ventilator control optimizer 302 integrated with the ventilating system 304 illustrated in FIG. 3A, a set of light emitting diodes (LEDs) 314 configured to display operational and environmental conditions of the system. For instance, the LEDs might be used to display conditions such as system power, operating speed of the fan, detected dew point trends, and operating status of the dehumidifier. Other conditions and parameters can also be monitored and displayed in the same manner and will be apparent to one skilled in the art. Any number of LEDs can be integrated into the unit, for example 1 to 10 LEDs. As shown in FIG. 3B there are 5 LEDs. It is also envisioned to replace the individual LEDs with an LED panel, or alternatively an LCD panel to display the operational and environmental conditions of the system.

Figure 4:
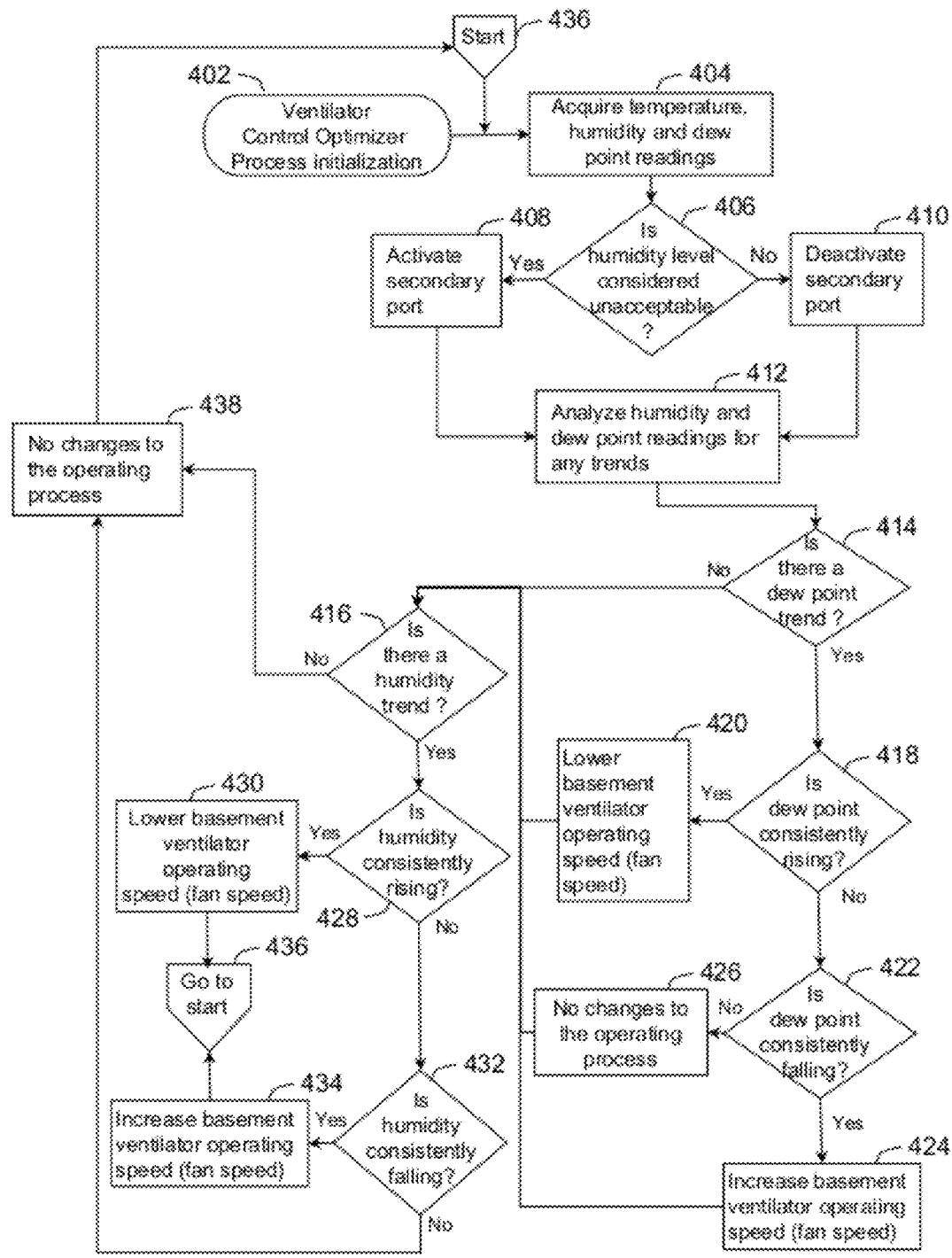
FIG. 4 shows an example of the control process used by the ventilator control optimizer.

FIG. 4 shows a flow chart for an exemplary control process executed in the ventilator control optimizer. Once the ventilator optimization process starts 402 the unit will acquire the temperature, humidity and dew point 404 after a predetermined time period has elapsed. If the humidity level reaches a level considered as unacceptable 406, a secondary port is activated 408, once the humidity is below this level the secondary port is deactivated 410. The secondary port, for example implemented as a power outlet, can be used for optional auxiliary systems, for example a dehumidifier, to reduce the humidity to levels considered acceptable. The unacceptable humidity may be determined by a reference threshold for humidity and/or dew point value. The reference threshold may be pre-programmed into a memory. After acquiring a set number of consecutive readings, the unit will start to analyze trends 412. It is first determined whether there is a dew point trend 414, if there is none, the process will continue to check humidity trend 416. If the analysis detects a rising dew point trend 418, the ventilator control optimizer will lower the operating fan speed of the ventilator 420 and continue to check humidity trend 416. If the analysis detects a falling dew point 422, the unit will increase the operating speed (fan speed) 424 and the ventilator control optimizer continues to check humidity trend 416. If the dew point is not consistently falling, no change 426 is needed, the ventilator control optimizer continues to check humidity trend 416. If the humidity is increasing 428, the ventilator control optimizer reduces the operating speed (fan speed) 430 and if the humidity level is decreasing 432, the ventilator control optimizer will increase the operating speed 434. The ventilator control optimizer repeats the process by logging a new set of temperature, humidity and dew point readings and doing another analysis 436. In case of a conflict due to contradictory humidity and dew point trends, the dew point trends may have priority and may overwrite any changes made by the process during the humidity trend analysis.

If there are no detected trends, the unit remains in its current state of operation and continues 438 to acquire readings so that it can eventually establish a trend.

Embodiments within the scope of the present invention can be implemented in digital electronic circuitry, or in computer hardware, firmware, software, or in combinations thereof. Apparatus within the scope of the present invention can be implemented in a computer program product tangibly embodied in a machine-readable storage device for execution by a programmable processor; and method actions within the scope of the present invention can be performed by a programmable processor executing a program of instructions to perform functions of the invention by operating on input data and generating output. Embodiments within the scope of the present invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files. Embodiments within the scope of the present invention include computer-readable media for carrying or having computer-executable instructions, computer-readable instructions, or data structures stored thereon. Such computer-readable media may be any available media, which is accessible by a general-purpose or special-purpose computer system. Examples of computer-readable media may include physical storage media such as RAM, ROM, EPROM including but not limited to flash memory, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. Any of the foregoing can be supplemented by, or incorporated in, ASICs (application-specific integrated circuits).

Although various aspects of the present invention have been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

The invention claimed is:

1. A method for controlling a ventilator or ventilation system for the exchange of air from a basement or crawlspace of a building to an exterior environment of the building, the method comprising:

obtaining temperature, humidity and/or dew point measurements of the air within the basement or crawlspace over time;

determining trends in the temperature, humidity and/or dew point measurements of the air within the basement or crawlspace based on said measurements obtained over time; and adjusting a rate of air exchange from the basement or crawlspace to the exterior environment based on the determined trends, wherein the rate of air exchange from the basement or crawlspace to the exterior environment is lowered if the humidity and/or dew point of the air within the basement or crawlspace is increasing, and the rate of air exchange from the basement or crawlspace to the exterior environment is increased if the humidity and/or dew point of the air within the basement or crawlspace is decreasing.

2. The method according to claim 1, wherein the temperature, humidity and/or dew point are read by a humidity and temperature sensor and stored in a memory.

3. The method according to claim 1, wherein the ventilator or ventilation system comprises an air circulation system including a fan for exchanging the air from the basement or crawlspace to the exterior environment.

4. The method according to claim 3, wherein the fan speed is lowered if the humidity and/or dew point of the air within the basement or crawlspace is increasing, and the fan speed is increased if the humidity and/or dew point of the air within the basement or crawlspace is decreasing.

5. The method according to claim 1, wherein the ventilator or ventilation system is configured to cooperate with a dehumidifier, said method further comprising:

comparing said humidity and/or dew point measurements of the air within the basement or crawlspace to at least one reference threshold humidity and/or dew point value; and activating the dehumidifier when the humidity and/or dew point measurements of the air within the basement or crawlspace exceeds the reference threshold value.

6. The method according to claim 5, wherein the dehumidifier unit is a stand-alone unit or an integrated unit operably arranged and configured within the ventilator or ventilation system.

7. The method according to claim 5, wherein the at least one reference threshold humidity and/or dew point value is pre-programmed into a memory.

8. A system for optimizing control of a ventilator or ventilation system used for exchanging air from a basement or crawlspace of a building to an exterior environment of the building, said system comprising:

at least one sensor for measuring temperature, humidity and/or dew point conditions of the air within the basement or crawlspace over time;

an electronic control system operably linked to the at least one sensor and configured to receive temperature, humidity and/or dew point measurements from the at least one sensor and determine trends in said temperature, humidity and/or dew point measurements over time; and a ventilation control system operably linked to the ventilator or ventilation system and controlled by the electronic control system, the ventilation control system being configured to adjust a rate of air exchange from the basement or crawlspace to the exterior environment based on the determined trends, wherein the rate of air exchange from the basement or crawlspace to the exterior environment is lowered if the humidity and/or dew point of the air within the basement or crawlspace is increasing, and the rate of air exchange from the basement or crawlspace to the exterior environment is increased if the humidity and/or dew point of the air within the basement or crawlspace is decreasing.

9. The system according to claim 8, wherein the electronic control system includes a microcontroller and circuitry to control power distribution to said ventilator or ventilation system.

10. The system according to claim 9, wherein the ventilator or ventilation system includes an air circulation system, the air circulation system including a fan for exchanging the air from the basement or crawlspace to the exterior environment, and the electronic control system is configured to lower the fan speed if the humidity and/or dew point of the air within the basement or crawlspace is increasing, and increase or maintain constant the fan speed if the humidity and/or dew point of the air within the basement or crawlspace is decreasing.

11. The system according to claim 10, wherein the ventilator or ventilation system cooperates with a dehumidifier and the electronic control system is configured to control operation of said dehumidifier.

12. The system according to claim 11, wherein the electronic control system compares said humidity and/or dew point measurements of the air within the basement or crawlspace to a reference threshold humidity and/or dew point value, and activates the dehumidifier when the humidity and/or dew point measurements of the air within the basement or crawlspace exceeds the reference threshold value.

13. A device for controlling a ventilator or ventilation system used for exchanging air from a basement or crawlspace of a building to an exterior environment of the building, said device comprising:

at least one sensor for measuring temperature, humidity and/or dew point conditions of the air within the basement or crawlspace over time;

an electronic control system operably linked to the at least one sensor and configured to receive temperature, humidity and/or dew point measurements from the sensor and determine trends in said temperature, humidity and/or dew point measurements over time; and a ventilation control system adapted to operably link to the ventilator or ventilation system and controlled by the electronic control system, the ventilation control system being configured to adjust a rate of air exchange from the basement or crawlspace to the exterior environment based on the determined trends, wherein the rate of air exchange from the basement or crawlspace to the exterior environment is lowered if the humidity and/or dew point of the air within the basement or crawlspace is increasing, and the rate of air exchange from the basement or crawlspace to the exterior environment is increased if the humidity and/or dew point of the air within the basement or crawlspace is decreasing.

14. The device according to claim 13, wherein the electronic control system includes a microcontroller and circuitry to control power distribution to said ventilator or ventilation system.

15. The device according to claim 13, wherein the ventilator or ventilation system includes an air circulation system, the air circulation system including at least one fan for exchanging the air from the basement or crawlspace to the exterior environment, and the electronic control system is configured to lower the fan speed if the humidity and/or dew point of the air within the basement or crawlspace is increasing, and increase the fan speed if the humidity and/or dew point of the air within the basement or crawlspace is decreasing.

16. The device according to claim 15, wherein the ventilator or ventilation system cooperates with a dehumidifier and the electronic control system is configured to control operation of said dehumidifier.

17. The device according to claim 16, wherein the electronic control system compares said humidity and/or dew point measurements of the air within the basement or crawlspace to a reference threshold humidity and/or dew point value, and activates the dehumidifier when the humidity and/or dew point of the air within the basement or crawlspace exceeds the reference threshold value.

18. The device according to claim 13, further comprising a casing which houses the at least one sensor and electrical components of the electronic control system, at least a portion of the casing being perforated to allow fresh air to pass through to the sensor.

19. The device according to claim 13, wherein the ventilation control system is equipped with a plurality of LEDs, an LCD panel or both for displaying operating details of the ventilator or ventilation system.

20. The device according to claim 13, wherein the device is integrated into a ventilator unit configured to communicate with ducts of said ventilation system.

* * * * *